Figures 1, 2:
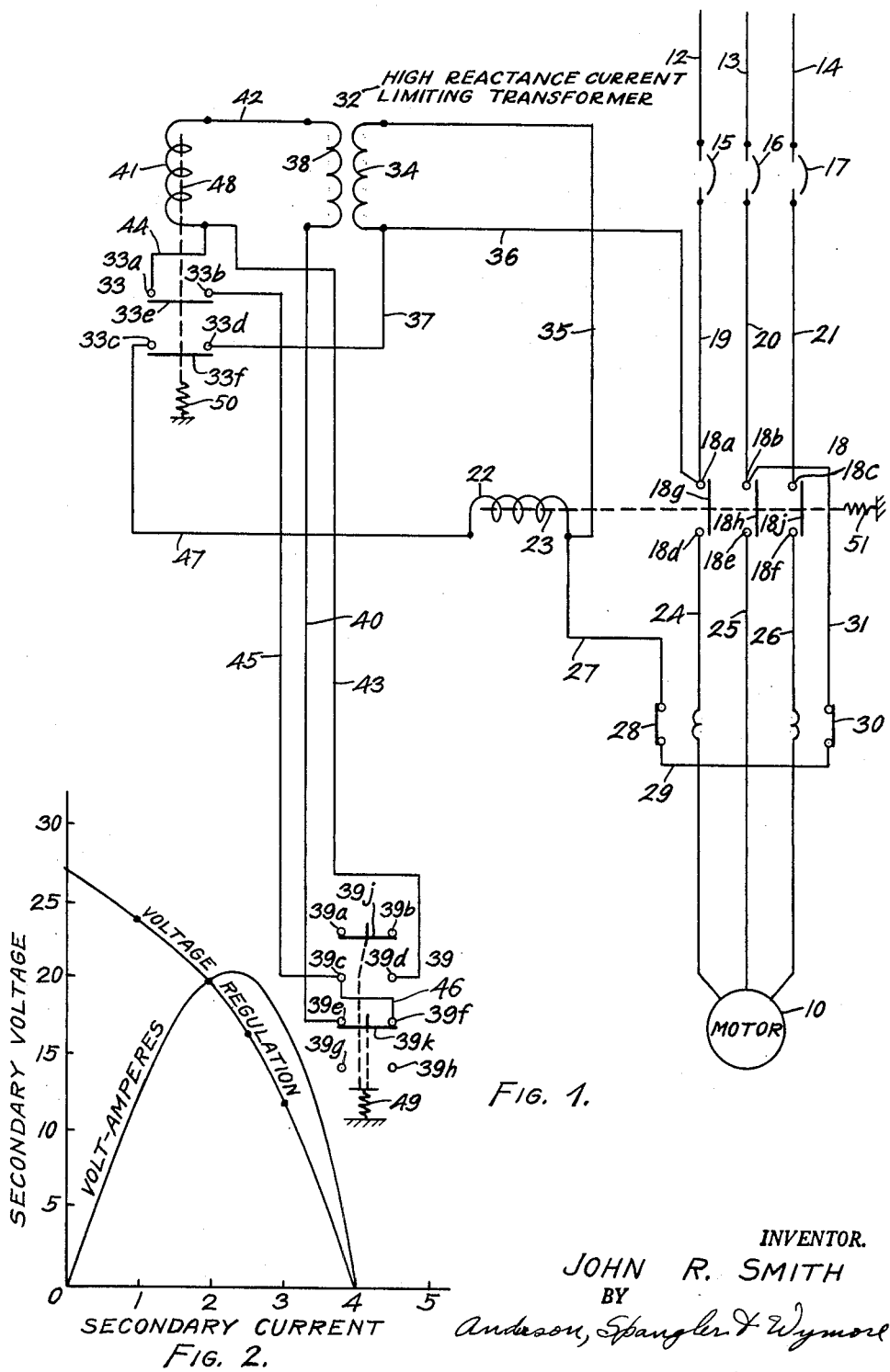

Nov. 17, 1964

J. R. SMITH 3,157,799

SYSTEM FOR SELF-DRYING CONTROL CONDUCTORS
IN MOIST ATMOSPHERE
Filed Dec. 5, 1960

INVENTOR.
JOHN R. SMITH
BY
Anderson, Spangler & Wymore
ATTORNEYS

United States Patent Office 3,157,799
Patented Nov. 17, 1964

3,157,799
SYSTEM FOR SELF-DRYING CONTROL CONDUCTORS IN MOIST ATMOSPHERE
John R. Smith, Denver, Colo., assignor to Stearns-Roger Manufacturing Company, Denver, Colo., a corporation of Colorado
Filed Dec. 5, 1960, Ser. No. 73,591
4 Claims. (Cl. 307—92)

This invention relates broadly to an electric motor control system and more particularly to a system for the control of an electric motor from a remote station utilizing low voltage in the control circuit.

In recent years there has been an increasing trend to provide remote push button controls for starting and stopping a motor, wherein the push button station is located on the end of lengths of multiwire portable cable. Where such cable lies upon a floor it is subject to severe injury and complete shorting of the conductors. Further, when such cable is used in a high moisture area, the control cable is subject to being saturated with moisture or condensate with attendant flash over.

It is a principal object of the present invention to provide an improved motor control system which eliminates control failures from electrical flash over in highly contaminated areas.

It is a further object of the present invention to provide an improved remote motor control system which is self corrective of flash over failures due to excess moisture in the control circuit.

Another object of the present invention is to provide an improved remote motor control system utilizing reduced voltage in the control circuits.

Another object of the present invention is to provide an improved remote motor control system devoid of foreign circuits in the controller such that the circuits are dead when the branch circuit disconnect is opened.

Another object of the present invention is to provide an improved remote motor control system wherein the control circuit is current limiting in the event of a short circuit therein.

A further object of the present invention is to provide an improved remote motor control system which avoids the unexpected starting of a motor controller thereby as the branch disconnect is closed.

In accordance with the invention, the motor control system comprises line switching means for selectively connecting a motor to a source of electrical current, control means for actuating the switching means and control switch means for selectively energizing the control means actuating the line switching means to connect the motor to a source of electrical current. The control means includes circuit isolation and current limiting means isolating the control switch circuit from the control actuating circuit. The control system further includes a circuit disconnect means adapted to disconnect the motor, control means and control switch means from a source of electrical power when a portion of the system is opened for service or repair. The control switch means includes means to provide sustained lock-in of the control means on start-up and momentary contact shut-down.

For a better understanding of the present invention, together with other and further objects thereof, reference is had to the following description taken in connection with the accompanying drawing and its scope will be pointed out in the appended claims.

In the drawing, FIGURE 1 is a circuit diagram of the motor control system according to the present invention and FIGURE 2 is a graph depicting the voltage regulation curve for a high reactance transformer.

Referring to FIGURE 1, there is shown a circuit diagram of a motor control system embodying the present invention. The motor 10 is shown as a three phase motor; however, it will be readily understood that single phase motors may be so controlled. The system is connected to a source of three phase electric current by means of conductors 12, 13 and 14, with conductor 13 being the center conductor. Conductors 12, 13 and 14 are seen to include a safety device in the form of a circuit breaker having contacts 15, 16 and 17. The circuit breaker contacts are each in turn connected to a contact of multiple contact line switch 18 by means of conductors 19, 20 and 21 connected respectively to contacts 18a, 18b and 18c of switch 18. Contacts 18a, 18b and 18c are connectable to contacts 18d, 18e and 18f by means of contact bars 18g, 18h and 18j actuated by solenoid 22 having its core 23 operatively connected to bars 18g, 18h and 18j. Contacts 18d, 18e and 18f are connected to motor 10 via conductors 24, 25 and 26.

One end of the coil of solenoid 22 is connected to the center conductor of the current source via conductor 27, contacts 28, conductor 29, contacts 30, conductor 31 and contact 18b. Contacts 28, 30 are heat-sensitive overload relays series connected by conductor 29 actuated by appropriately positioned heater coils in conductors 24 and 26. Contacts 28 and 30, normally closed, will open in the presence of an overload of motor 10, due to the heat developed in the heater coils.

The control circuit, in addition to normally open solenoid actuated switch 18, is seen to include an isolation transformer 32 and normally open solenoid actuated contact switch 33. Transformer 32 is of a current limiting type such as a high reactance transformer. One end of the primary winding 34 of transformer 32 is connected to one side of the solenoid coil 22 via conductor 35 and to the center conductor of the current source via conductor 27, contacts 28, conductor 29, contacts 30 and conductors 31 and 20. The other side of the primary winding 34 is connected to one side of the current source, such as through contact 18a, via conductor 36. The other side of the primary is also connected to contact 33d via conductor 37.

One side of the secondary winding 38 of transformer 32 is connected to contact 39e of a momentary contact start-sustained contact run switch 39 via conductor 40. The other side of the secondary is connected to one side of the actuating coil 41 for solenoid actuated switch 33 via conductor 42. The other side of actuating coil 41 is connected to contact 39d of switch 39 via conductor 43. This side of actuating coil 41 is also connected to contact 33a of solenoid actuated switch 33 via conductor 44. In addition, contact 33b of switch 33 and contact 39c of switch 39 are connected by conductor 45 and contacts 39c and 39f of switch 39 are connected by conductor 46. Contact 33c of switch 33 is connected to actuating coil 22 of solenoid actuated switch 18 via conductor 47.

It will be noted that contacts 33a and 33b and, contacts 33c and 33d of switch 33 are paired and are adapted to be connected by contact bars 33e and 33f, respectively, when actuated by core 48 operatively connected thereto. Contacts 39a and 39b; 39c and 39d; 39e and 39f; and, 39g and 39h are paired with the first two and the last two of pairs being adapted to be connected respectively by contact bars 39j and 39k. Contact bar 39k is biased into contact with contacts 39e and 39f by means of spring 49, as shown, and contact bar 39j into contact with contacts 39a and 39b.

To start motor 10 using the control circuit of the present invention, contact bar 39j of switch 39 is manually or otherwise actuated against the bias of spring 48 to connect contacts 39c and 39d. It will be appreciated that contact bar 39k is actuated separately to stop motor 10 as will be explained. In the starting operation contact bar 39k maintains contact with contacts 39e and 39f. The closing of contacts 39c and 39d completes a circuit through the actuating coil 41 of solenoid actuated switch 33 via contact 39d, conductor 43, solenoid actuating coil 41, conductor 42, secondary winding 38 of transformer 32, conductor 40, contact 39e, contact bar 39k, contact 39f, conductor 46, contact 39c, contact bar 39j to contact 39d. Since the primary 34 of transformer 32 is continuously energized through conductor 36 connecting one side of the primary to one side of a source of current and conductor 35 connecting the other side through a disconnect to the center conductor of a source of current, current flow is established in actuating coil 41 effecting a translation of core 48. The translation of core 48 moves contact bar 33e of switch 33 into contact with contacts 33a and 33b and contact bar 33f into contact with contacts 33c and 33d. Contact bar 39j may now be released since the current flow through actuating coil 41 is maintained through conductor 44, contact 33a, contact bar 33e, contact 33b and conductor 45 to contact 39c which acts as a holding circuit for solenoid actuated switch 33. The closing of contact bar 33f with contacts 33c and 33d completes a circuit from one side of a source of current to actuating coil 22 of line switch 18 via conductor 36, conductor 37, contact 33d, contact bar 33f, contact 33c and conductor 47. Current flow is thus established in actuating coil 23 as the other side is connected to the center conductor of the source of current. The energizing of actuating coil 22 effects a translation of core 23 of solenoid actuated line switch 18, moving contact bars 18g, 18h and 18j, respectively, into contact with contacts 18a and 18d; 18b and 18e; and, 18c and 18f connecting the source of current to motor 10 whereupon the motor is started and put into operation.

To stop the motor 10, contact bar 39k of switch 39 is disconnected momentarily from contacts 39e and 39f breaking the holding circuit to the actuating coil 41 of solenoid actuated switch 33. Contact bars 33e and 33f of switch 33 drop out, due to the bias of spring 50, to disconnect actuating coils 41 and 22 of solenoid actuated switches 33 and 18. Contact bars 18g, 18h and 18j drop due to the bias of spring 51 disconnecting motor 10 from the source of current.

An interlock or circuit disconnect connected in series with contacts 28 and 30 may be operatively connected to an access to the system, such as a box cover and the like, so that when the system is opened for inspection or repair the center conductor of the current source is disconnected to prevent the system from being energized.

The voltage-current curve for transformer 32 is shown by FIGURE 2. The control voltage present in conductors 40, 43 and 45 which may be rather long and subject to abuse and severe ambient conditions, is normally limited to about 25 volts and the power to about 50 voltamperes by transformer 32. A short circuit in the control circuit will limit the secondary amperage to about 2 amperes. This is not enough amperage to seriously damage the conductors, contacts or other control equipment. In addition, the 2 amperes which will flow under short conditions, results in the production of heat in the presence of impure water or other electrolyte. The heat produced will evaporate the moisture and restore the control circuit to normal. The evaporation and restoration of the circuit usually occurs in a matter of minutes and ordinarily may not interrupt the operation of the equipment controlled.

Thus, by employing the improved control system of the present invention which includes the use of a hi-reactance control transformer in the control circuit of one and three phase motor controllers, it is possible to substantially obviate physical damage to the control circuit even if a short circuit or flash over should occur.

While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. An electric load control system having control means remote therefrom and connected by conductors adapted to pass through an electrically conductive atmosphere which includes water comprising in combination a first solenoid actuated switch adapted on actuation to connect a load to a first electric current source, a second solenoid actuated switch adapted on actuation to connect the actuating coil of the first solenoid actuated switch to the first electric current source, a circuit isolation and current limiting means consisting of a transformer having primary and secondary windings, said transformer being of a type that when the secondary winding is short circuited, the voltage therein drops to a minimum value and the current flow therein is limited to a predetermined maximum, nondestructive amount, said transformer having its primary winding connected to the first current source with the secondary winding forming a second electric current source, and switch means for connecting the actuating coil of the second solenoid actuated switch to the second electric source wherein a short circuit in the control circuit occasioned by the conductive atmosphere is cured by heat generated in the conductors in the evaporation of the water.

2. A control system according to claim 1, wherein the second solenoid actuated switch includes contacts connected to self-energize the actuating coil thereof when connected to the second current source and the switch means selectively connecting the actuating coil of the second solenoid actuated switch is a momentary contact switch including a sustained contact switch adapted to selectively disable the self-energizing and holding circuit of the second solenoid actuated switch.

3. A low voltage, power-limiting electric control system for use in an electrically conductive environment including water while avoiding flash-over and burnout failure in the control circuit including a high reactance, current-limiting transformer of a type which when under shorted secondary conditions, the flow of current therethrough is limited to a predetermined maximum, non-destructive amount having its primary winding connected to a relatively high-voltage source of electric current, a low-voltage electrically actuated switching means having its actuating circuit connected to the secondary of said transformer serially through remotely located control switch means and interconnecting conductors adapted to pass through an electrically conductive atmosphere and a controlled circuit including a high-voltage electrically actuated line switching means having its actuating circuit connected to a relatively high-voltage source serially through contacts of the low-voltage switching means and adapted, on being actuated, to connect a load to a source of line voltage, the high reactance transformer serving to limit the current flow in the control circuit, in the event of a short circuit or flash-over therein, to a non-destructive level wherein a short circuit due to the environment is alleviated due to the heat generated in the interconnecting conductors evaporating the water.

4. A control system according to claim 3 wherein the control switch means comprises a momentary contact start, sustained contact running switch and the low voltage switching means includes contacts adapted to self-lock said control means switch when the circuit is completed through the transformer secondary and the actuating circuit of the low-voltage switching means by momentary closure of the control switch means.

References Cited in the file of this patent

UNITED STATES PATENTS

| | | |
|---|---|---|
| 2,309,794 | Seeger et al. | Feb. 2, 1943 |
| 2,320,896 | Snyder | June 1, 1943 |
| 2,883,597 | Eck | Apr. 21, 1959 |
| 2,928,290 | Hosea et al. | Mar. 15, 1960 |
| 2,938,155 | Lebocey | May 24, 1960 |